May 20, 1958 G. G. GRANT 2,835,091
APPARATUS FOR ASSEMBLING COLLAPSIBLE TUBES AND
FILLING SEMI-SOLID MATERIAL THEREIN
Filed Dec. 12, 1956 3 Sheets-Sheet 2
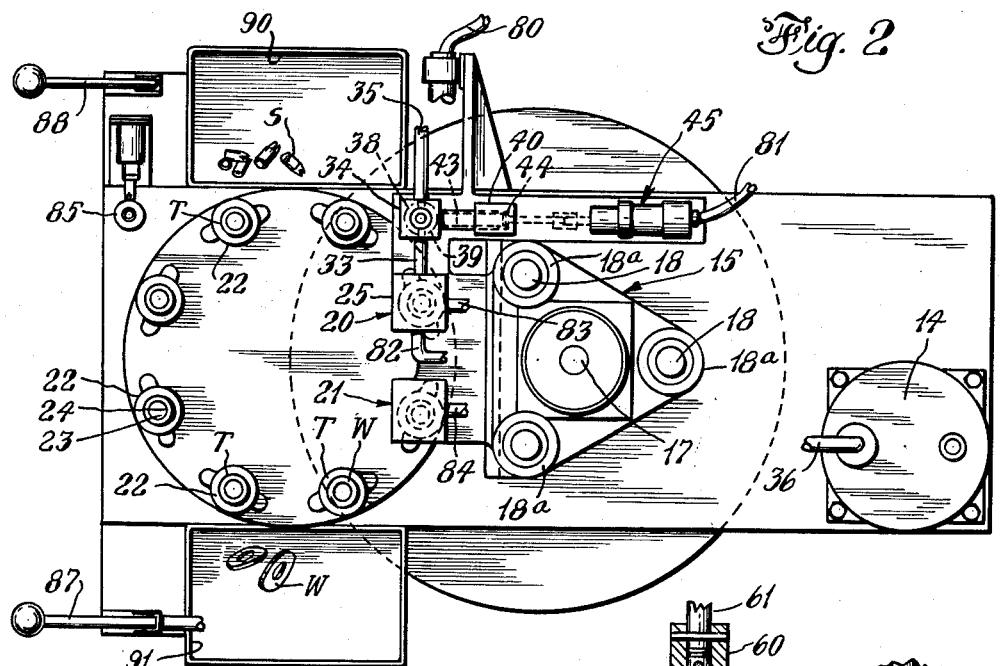
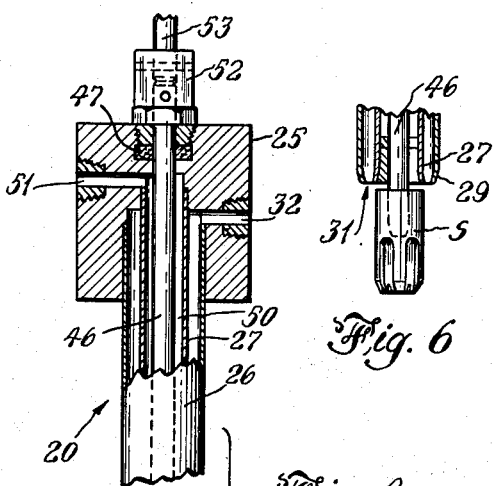
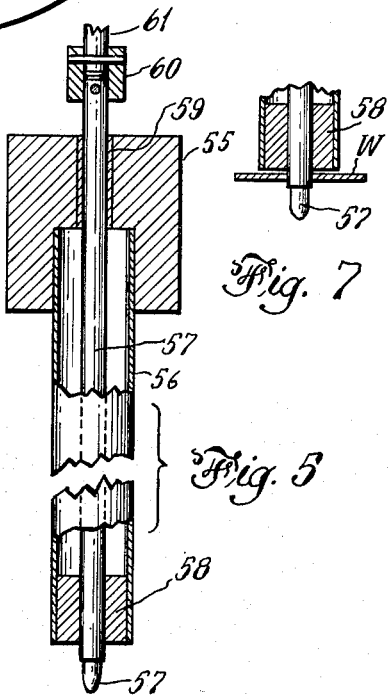
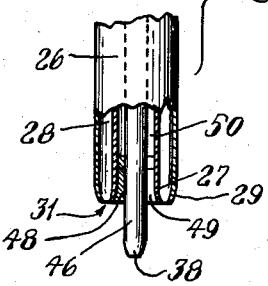
INVENTOR.
GARY G. GRANT
BY
Campbell, Brumbaugh, Free & Graves
ATTORNEYS

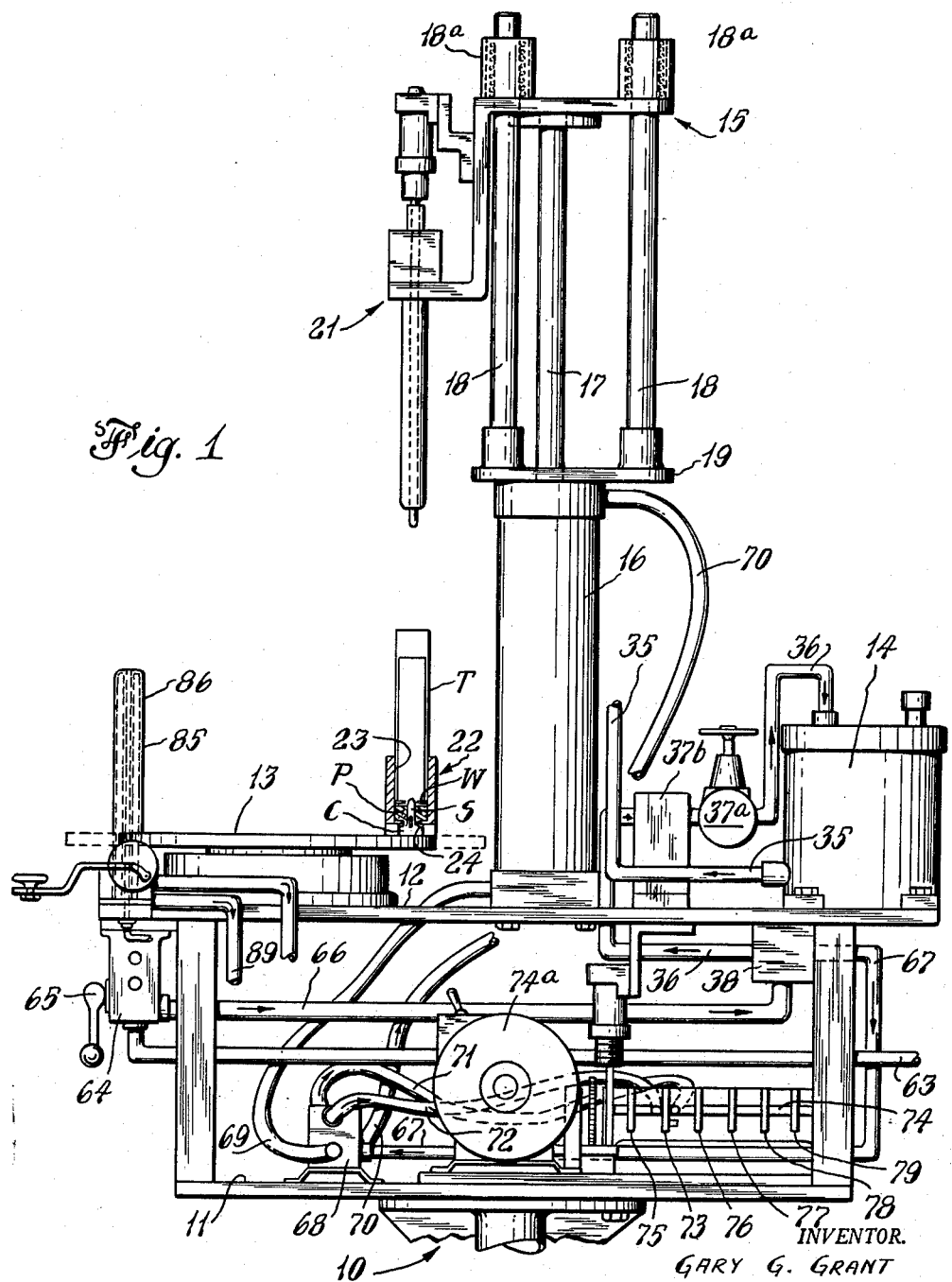

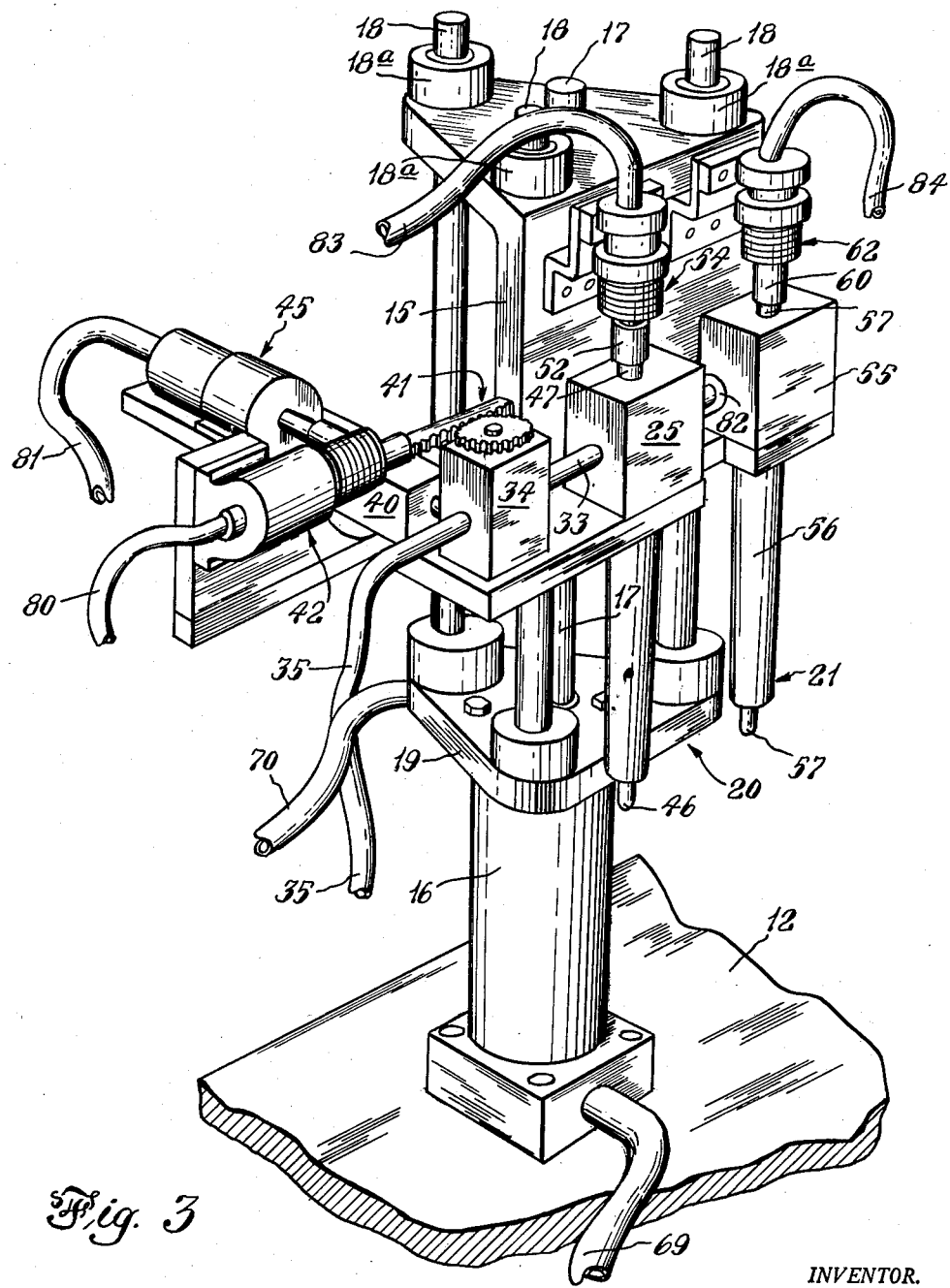

United States Patent Office 2,835,091
Patented May 20, 1958

2,835,091

APPARATUS FOR ASSEMBLING COLLAPSIBLE TUBES AND FILLING SEMI-SOLID MATERIAL THEREIN

Gary G. Grant, Harrison, N. Y., assignor to Lever Brothers Company, New York, N. Y., a corporation of Maine Application December 12, 1956, Serial No. 627,826

15 Claims. (Cl. 53—239)

This invention relates to apparatus for assembling containers, such as collapsible tubes, and for filling semi-solid or plastic material into the tubes.

In United States patent applications, Serial Nos. 377,023, now abandoned, and 513,261, now Patent 2,789,731 dated April 23, 1957, there are disclosed paste dispensing devices which extrude paste-like material in the form, for example, of a white stream of paste lined with red stripes in the manner of a candy stick. These dispensing devices utilize a channelled bushing or sleeve mounted in the head end of a tube and extending inwardly along the axis of the tube for a short distance. Colored paste material is filled into the head end of the tube to a point not beyond the innermost end of the sleeve and white paste material is filled into the body of the tube beyond the sleeve. When the tube is squeezed the white paste is extruded through the center of the sleeve while at the same time the colored paste is extruded through the channels of the sleeve to stripe the issuing white stream. For convenience, the paste material will be described hereinafter as toothpaste it being understood that the invention is not limited to that material.

The assembly and filling of these toothpaste tubes is difficult to accomplish on a commercial scale and the present invention has for one of its objects, therefore, to provide apparatus for mounting an apertured sleeve or bushing in the head end of a collapsible tube and to fill a colored paste-like material into the tube around the sleeve.

In accordance with the present invention, there is provided an apparatus including means for conveying unfilled tubes such as toothpaste tubes, with their bottoms open to a first station at which a sleeve in accordance with the disclosures of said pending applications is passed through the open bottom of the tube to be lodged in the mouth opening by means of a controlled mandrel assembly. A quantity of a semi-solid, plastic, or paste-like material such as toothpaste is introduced into the tube, also by way of the open bottom, to surround the sleeve. This material can be introduced into the tube through conduits adjacent the mandrel which lodges the sleeve in place, the mandrel preventing the paste-like material from passing through the axial opening. It has been found in practice that the lateral openings in the sleeve need not be blocked. The mandrel is then separated by a controlled power stroke from the sleeve and withdrawn from the tube, leaving the sleeve in place and the tube at least partially filled with a product such as a toothpaste. However, as the mandrel assembly is raised, the toothpaste has a tendency to elongate rather than to break off as desired. To obtain a clean break, a fluid pressure such as, for example, a blast of air is directed across the paste material in a manner to be described hereinafter. If desired, a barrier element can be inserted into the tube to rest on top of the first charge of filling material to separate it from a superimposed second material.

A representative embodiment of the invention from which the above and other features and objects thereof will be readily understood is described below having reference to the accompanying drawings in which:

Figure 1 is a view in side elevation of a machine for making a toothpaste tube assembly capable of extruding striped toothpaste and for filling at least one of two different paste materials into each tube assembly;

Figure 2 is a top view of the apparatus of Figure 1;

Figure 3 is a view in perspective of the upper section of the apparatus of Figure 1;

Figure 4 is a side view partly in vertical section in an enlarged scale of the filler nozzle and mandrel assembly of the apparatus of Figure 1;

Figure 5 is a side view partly in vertical section and in enlarged scale of a mandrel assembly for inserting barriers between the two plastic products in each tube.

Figure 6 is a side view of the filler nozzle of Figure 4 showing a sleeve insert in position for insertion; and Figure 7 is a side view of the mandrel of Figure 5 showing a barrier insert in position for insertion.

Referring to the drawings, the invention is illustrated as embodied in apparatus particularly adapted for assembling sleeve members S in the mouths of collapsible tubes T (Figure 1); for filling a metered charge of a flowable, semi-solid or plastic material P, such as toothpaste, into the tube around the sleeve; and for inserting barrier elements W on top of the toothpaste. The apparatus includes a pedestal identified generally by the numeral 10 carrying a lower shelf 11 for supporting control mechanism to be described, and an upper shelf 12 which carries a rotatable table 13 and a fixed container or reservoir 14 for the paste material. Surmounting the rotatable table 13 is a vertically movable support 15 adapted to be raised and lowered by a drive assembly 16, which can take the form of a pneumatic cylinder assembly including a piston rod 17. The vertically movable support 15 is guided in its travel by slide posts 18, of which there are three, fixed to a mounting plate 19 supported in turn by the fixed shelf 12 through the frame of the pneumatic cylinder assembly 16. The support 15 has secured thereto three ball bushings 18a by means of which it slides freely up and down on the posts 18. In this fashion, the support 15 is able to move vertically with the piston rod 17 and at the same time is constrained against rotary movement.

Secured to the support 15 and movable therewith are a pair of station heads 20 and 21, best seen in Figure 2. The station head 20 comprises a sleeve-inserting and first filling assembly and the station 21 a barrier inserting assembly. Details of the station head 20 are shown in Figure 4 and of the station 21 in Figure 5.

The rotary table 13 carries, in circumferential array, a series of chucks 22 which, as best seen in Figure 1, include an upstanding sleeve 23 of sufficient inside diameter to receive an open ended and unfilled toothpaste tube T and, therebelow, an opening 24 of reduced diameter to receive the head end of the toothpaste tube with its cap C in place. An open ended toothpaste tube T with sleeve S, the charge of plastic material P such as toothpaste, and the barrier element W in place is shown in place in a chuck 22 in Figure 1. The axis of the rotary table 13 is so arranged that the chucks 22 are carried directly beneath the stations 20 and 21 in sequence.

As stated, the station head 20 includes mechanism for positioning the bushing or sleeves in the tubes at their head ends and also for introducing a charge of the material, in the illustrated case, colored toothpaste, which is to overlie or stripe the main stream of toothpaste which will issue through the center of the sleeve S. The station head assembly 20 includes a mounting block 25 secured to the movable support 15 and carrying a pair of depending, concentric sleeves 26 and 27 which between them define a toroidal channel 28 and which are spun or flared respectively inwardly and outwardly at their lower ends as indicated by the numerals 29 and 30 to define a nozzle 31. The nozzle 31 and toroidal space 28 are connected by means of a duct 32, a conduit 33 (Figure 3), a rotary valve 34 and a flexible conduit 35 (Figures 1 and 2) to the container 14 for the plastic material. The container 14 is maintained under continuous pressure by means of an input air conduit 36 fitted with a pressure regulator 37a and a filter 37b and connected to an air manifold 38.

The valve 34 for the semi-solid material includes as best seen in Figure 2 a rotary valve element 38 including a right angularly arranged duct 39 adapted to selectively connect the conduit 35 to a metering cylinder 40 or the metering cylinder 40 to the conduit 33, which leads directly to the nozzle 31 at the lower tip of the assembly 20. The operation of the valve rotor element 38 is controlled through a gear and rack assembly 41 (Figure 3), the rack portion of which is driven to and fro under the control of an air cylinder unit indicated generally by the numeral 42 operated by a pneumatic system described below. The metering cylinder 40 includes a chamber 43 of predetermined size in which works a piston 44 controlled by an air cylinder assembly 45 also adapted to be controlled by the pneumatic pressure system described below.

Referring again to Figure 4, passing through the mounting block 25 and through the inner sleeve 27 with clearance on all sides is a mandrel or slide bar 46, the upper end of which slides in a packing sleeve 47 and the lower end of which slides in a ribbed or channelled bushing 48, the channels 49 of which place a toroidally shaped air duct 50 between the mandrel 46 and the sleeve 27 in communication with the atmosphere at the tip of the mandrel rod 46. The upper end of the air duct 50 is connected by a duct 51 in the block 25 to the controlled source of pneumatic pressure to be described. The upper end of the mandrel 46 is connected through a coupling link 52 to a piston rod 53 which is part of an air cylinder assembly also controlled by the pneumatic pressure system.

The second station head 21 which is adapted to install the barrier elements W between the two charges of semi-solid material which are ultimately placed in the tubes T includes, as best seen in Figure 5, a mounting block 55 secured to the vertically movable support 15 and from which depends a sleeve 56 within which is slidably mounted a mandrel or rod 57 which slides at its lower end in a bushing sleeve 58 and at its upper end in a bushing sleeve 59 in the block 55. The upper end of the rod 57 is joined through a suitable coupling link 60 to a piston rod 61 which is part of an air cylinder assembly 62 (Figure 3) also adapted to be controlled through the pneumatic pressure system.

The pneumatic system by means of which the apparatus is controlled includes a main air inlet conduit 63 adapted to be connected to a suitable source of air pressure in the range, for example, of 60 p. s. i. connected to a shutoff valve 64, including a control level 65 conveniently accessible to the operator, and a conduit 66 leading to the manifold 38. As stated, one of the outlets of the manifold 38 is connected through the conduit 36 to apply continuous pressure to the closed container 14. Six other outlets, only one of which is visible in Figure 1 of the drawing, are connected to individual control valves. Basically all of the control valves and their pressure source connections to the manifold are identical and, therefore, for simplicity only one valve and its connections are illustrated and described in detail.

Referring to Figure 1, the manifold includes an output 67 which connects to the input of a valve 68 which can take the form of a conventional four way valve having reversible pressure and exhaust connections and adapted to be controlled pneumatically. The output of the illustrated valve 68 is connected by means of a pair of conduits 69 and 70 to opposite ends of the cylinder 16 which raises and lowers the support 15 through the agency of the piston rod 17, as described. Control of the valve 68 is effected through a pair of air conduits 71 and 72, the air supply to which is controlled by means of cam 73 driven by a cam shaft 74 driven in turn by a timer motor 74a. The cam shaft 74 inlcudes, in addition to the cam 73, cams 75, 76, 77, 78 and 79 which control the remaining five, unillustrated valve units. The cam 75 is adapted to control, through its corresponding valve unit, the air cylinder 42 which operates the rotary valve 34 for the semi-solid material, connections being made through the conduit 80; the cam 76 is adapted to control, through an air conduit 81, the air cylinder 45 which operates the metering cylinder 40; the cam 77 is adapted to control an air blast, via conduit 82, through the channelled bushing 49 at the tip of the mandrel 46 of the station 20; the cam 78 is adapted to control, through a conduit 83, the air cylinder 54 which raises and lowers the mandrel 46 within the sleeve 27; and the cam 79 is adapted to control, through a conduit 84, the air cylinder 62 which raises and lowers the mandrel 57 within the sleeve 56 of the station 21.

The apparatus can include, for the convenience of the operator, an air jet tube cleaner in the form of an upstanding sleeve 85 formed with a central air duct 86 and over which the open base-end of a tube can be fitted, in a manual operation, to be blown clean. Control of the apparatus is effected through a pair of control levers 87 and 88 which operate series connected switches which energize air valve means (not shown) to operate, through the conduit 89, an air cylinder unit (also not shown) which trips a timer release pall and sets the timer motor 74a into motion through one complete cycle of operation.

In operation, the operator stands at the front of the machine and places tubes T in the chucks 22 head end down. As shown in Figure 1, the tubes are expanded into generally cylindrical shape and their bases or bottom ends are not yet sealed off. The operator also places for each cycle of operation of the machine one of the sleeves S, which he can select from a conveniently located storage magazine 90 to his left, on the mandrel 46 of the station 20. The mandrel is so dimensioned relatively to the inside diameter of the sleeves S that a reasonably tight friction fit obtains. The operator also places one of the barrier elements W selected from the storage magazine 91 to his right on the mandrel 57 of the station 21, also in a snug, friction fit. If desired, a slight negative pressure, or vacuum may be provided, for example, within the space between the mandrel 57 and the sleeve 56 with suitable apertures through the bushing 58 such that the barrier elements W may be held in place thereby. He then initiates the cycle of operation of the apparatus by simultaneously operating the two actuating levers 87 and 88, causing the rotary table 13 to be indexed in a clockwise direction as seen in Figure 2 to carry a chuck 22 with an open bottom toothpaste tube therein beneath the station 20. At the same time, the tube which was at the station 20 will move to station 21 and the tube at station 21, having received a sleeve S, a first charge of plastic material, and a barrier element W, will move into view at the operator's right to be removed from the machine. The support plate or cross head 15 is then lowered automatically through the action of the cylinder 16 to carry the sleeve S and its mandrel 46 into the tube to lodge the sleeve in the mouth of the tube adjacent the cap. At the same time, an element W is placed on top of the semi-plastic material at the station 21 by the lowering of the mandrel 57 into the next adjacent second tube. The metering cylinder 40, through the air cylinder 45, is then actuated, while the mandrel 46 is plugging the sleeve S to inject a charge of plastic material into the tube around the sleeve via the duct 39 (in the valve rotor 38), the conduit 33, the duct 28, and the circular nozzle 31. Next, the cylinder 54 is actuated to withdraw the mandrel 46 slightly up into the sleeve 27 to release the sleeve S therefrom. At the same time, an air blast is introduced through the duct 51 and duct space 50 to cleanly sever the colored paste material at the nozzle 31.

Meantime, at the station 21, the air cylinder 62 will have been actuated to withdraw the mandrel 57 from the barrier element W by lowering the sleeve 56 to push the element W very slightly over the sleeve S to place it on top of the colored paste material in the position indicated in the illustrated tube assembly in Figure 1. The entire mandrel assembly 56 and 57 is then raised from the tube. These operations having been carried out, the piston 43 of the metering cylinder unit 40 will be at its forward position. The valve 34 is then operated to place the metering cylinder unit 40 in communication with the plastic infeed duct 35 via the right angle duct 39 in the valve rotor 38, after which the piston 44 in the cylinder 40 is pulled rearwardly to receive a fresh charge of plastic material from the source 14. The amount of this charge is so selected that it fills the head end of the tube to a point not beyond the innermost end of the sleeve S so that none of this product can ever find its way through the axial opening of the sleeve. When the support 15 reaches its upper limit, one cycle of operation will have been completed. The operator then removes the tube T, which has received its bushing sleeve S, its first charge of plastic material, and its barrier element W from the apparatus and places a freshly prepared tube on the next chuck 22 to his left, places a sleeve S on the mandrel 46, an element W on the mandrel 57, and initiates a new cycle of operation.

The partially filled tubes are passed to the next machine to receive their final charge of plastic material, in this case white toothpaste, after which the tubes are sealed at their bases.

It will be understood that while the present invention has been illustrated as embodied in a semi-automatic machine it can also be applied to a fully automatic machine in which the attention of an operator is not necessary. Also, if desired, a station can be provided for filling the second and final charge of plastic material into the tubes and sealing the tube ends to complete all of the operations at one machine. Other modifications and arrangements within the scope of the present invention will readily suggest themselves to those skilled in the art. Moreover, in those cases in which the unfilled tube assembly is prefabricated with the inner sleeve in place, the apparatus can be utilized with the mandrel serving as a plugging element, rather than as a combination sleeve-lodging and -plugging element. The invention should not, therefore, be regarded as limited except as defined by the following claims.

I claim:

1. Apparatus for placing materials in containers comprising a first tubular member to enter the containers, a second tubular member coaxially mounted within the first to define a flow channel therebetween to pass a flowable substance for injection into the containers, a mandrel within the second tubular member and adapted to carry parts to be placed in the containers, first means to establish a flow of the substance through the channel, and second means operable in timed relation to the first means to detach from the mandrel the parts to be placed into the containers.

2. Apparatus for placing materials in containers comprising a first tubular member to enter the containers, a second tubular member coaxially mounted within the first to define a flow channel therebetween to pass a flowable substance for injection into the containers, a mandrel within the second tubular member and adapted to carry parts to be placed in the containers, a mandrel in the second tubular member and adapted to carry parts to be placed in the containers, opposing lateral surfaces of the mandrel and the second tubular member defining an axial passageway terminating adjacent the parts carried thereby, first means to establish a flow of the substance through the channel into the containers, second means operable in timed relation to the first means to detach from the mandrel the parts to be placed into the containers, and forced air means to cleanly sever said flowable substance from said flow channel.

3. Apparatus for placing materials in containers comprising a first tubular member to enter the containers, a second tubular member coaxially mounted within the first to define a flow channel therebetween to pass a flowable substance for injection into the containers, a mandrel within the second tubular member and adapted to carry parts to be placed in the containers, a mandrel axially movably mounted in the second tubular member and adapted to carry parts to be placed in the containers, first means to establish a flow of the substance through the channel into the containers, and second means operable in timed relation to the second means to establish relative motion between the mandrel and the second tubular member to separate the parts from the mandrel in the containers.

4. Apparatus as set forth in claim 1 including a second mandrel spaced from the first and adapted to carry second parts, a movable support to carry the containers to successive locations adjacent the first and second mandrels, means to actuate the movable support, and means operable in timed relation to the support actuating means and also with said first and second means to detach the second parts from the second mandrel in the containers.

5. Apparatus as set forth in claim 1, said parts comprising sleeve members to be lodged in an opening in the container, said mandrel including a tip portion to enter the sleeves to block the passage of the flowable substance therethrough.

6. Apparatus as set forth in claim 5 including metering means to introduce quantities of the substance into the containers to fill the containers to a point not exceeding the inner ends of the sleeve members.

7. Apparatus as set forth in claim 6, said metering means for the flowable substance comprising a metering chamber to a source of the flowable substance, and valve means to successively connect the metering chamber to the source and to the channel between the tubular members.

8. Apparatus for placing materials in containers comprising a pair of tubular members coaxially mounted one within the other to define a flow channel therebetween to pass a product to be filled into containers, a mandrel slidably mounted within the inner tubular member, means to force the product through said space, and means to establish relative axial movement between the mandrel and the tubular members.

9. Apparatus for placing materials in containers comprising a generally tubular member to enter the containers, a mandrel slidably mounted in the tubular member and adapted to carry parts to be placed in the containers, and means to establish relative axial movement between the mandrel and tubular member to detach the parts therefrom.

10. Apparatus for placing materials in containers comprising a generally tubular member to enter the containers, a mandrel slidably mounted in the tubular member and adapted to carry parts to be placed in the containers, opposing lateral surfaces of the mandrel and the tubular member defining an axial passageway terminating adjacent the location of the parts carried thereby, and means to detach from the mandrel the parts to be placed into the containers.

11. Apparatus for placing flowable material in the space around axial discharge sleeves extending into container spaces, comprising a filling assembly including, a generally tubular member to enter the containers, a second generally tubular member coaxially mounted within the first to define a flow channel therebetween to pass a flowable substance for injection into the containers, a mandrel in the second tubular member to plug the sleeves against the passage of the flowable material therethrough, means to position the filling assembly in the containers with the mandrel plugging the sleeve against the passage of the flowable substance therethrough, and means to establish a flow of the substance through the channel and into the containers.

12. Apparatus for placing materials in collapsible tubes, comprising, means to support the tubes with their base ends open, a support head adjacent the means to support the tubes, filling means on the support head to inject a flowable substance into the tubes, a plugging member on the support head to block sleeve members disposed in the mouths of the tubes and extending inwardly into the body of the tubes axially thereof for a fraction of the tube length, means to establish relative movement between the support head and the means to support the tubes to cause the plugging member to plug the sleeves therein and to dispose the filling means adjacent the sleeves, and means to establish a flow of the substance into the tubes to fill them to points not exceeding the inner ends of the sleeves.

13. Apparatus as set forth in claim 12, said plugging member on the support head also comprising a mandrel for carrying the sleeve members and for lodging the sleeve members in the mouths of the tubes, and means to detach the mandrel from the sleeve members after the filling operation.

14. Apparatus as set forth in claim 13, a fluid channel terminating adjacent the place of support of the sleeve members on the mandrel, and means to establish pressure in the fluid channel to sever said flowable substance.

15. Apparatus as set forth in claim 12 including means to insert barrier elements into the tubes to rest on the filled substance adjacent the inner ends of the sleeves.

No references cited.

U. S. DEPARTMENT OF COMMERCE
PATENT OFFICE

CERTIFICATE OF CORRECTION

Patent No. 2,835,091     Gary G. Grant     May 20, 1958

It is hereby certified that error appears in the printed specification of the above numbered patent requiring correction and that the said Letters Patent should read as corrected below.

Column 3, line 58, for "level" read -- lever --; lines 69 and 70, for "output 67" read -- output conduit 67 --; column 4, line 5, for "inlcudes" read -- includes --.

Signed and sealed this 8th day of July 1958.

(SEAL)
Attest:

KARL H. AXLINE
Attesting Officer

ROBERT C. WATSON
Commissioner of Patents